Patented June 13, 1939

2,162,574

UNITED STATES PATENT OFFICE 2,162,574

HARD METAL ALLOY

Walther Dawihl, Kohlhasenbruck, near Neubabelsberg, and Karl Schröter, Berlin, Germany, assignors to General Electric Company, a corporation of New York No Drawing. Application December 23, 1937, Serial No. 181,318. In Germany May 15, 1937

4 Claims. (Cl. 75—136)

This invention has for its object hard metal alloys which are particularly intended for the manufacture of tools and working implements.

In the manufacture of tools and working implements frequently hard metal alloys are made use of which consist of a mixture of one or more carbides of metals of high melting point, such as tungsten carbide or tungsten carbide and titanium carbide, with one or more metals of the iron group, viz., iron, cobalt or nickel, the carbide or carbides forming the main constituent of the alloy while the metal or metals of the iron group are auxiliary metals. In the hard metal alloys of this class used in practice the percentage of auxiliary metal of the iron group amounts, as a rule, to less than 10%, but also higher percentages of auxiliary metal of the iron group have been suggested in certain cases, viz., up to 40%, namely in cases where shaped bodies are produced from these alloys by pressing and sintering, which subsequently are given the final shape by a mechanical operation. Hard metals of this class mainly consist of carbides of high melting point metals, and tools, for example turning tools, manufactured therefrom require the higher cutting speeds, the softer the material to be machined is.

The present invention starts now from the perception that these high cutting speeds required for machining soft materials cannot be realized in practice under all circumstances, in particular, if pieces of small dimensions are to be machined, for example to be turned. In addition, cutting edges having a great chip angle would have to be provided on tools made from the hard metals hitherto known, in order to render them suitable for machining soft materials. Such cutting edges, however, are not only difficult to apply, but have also easily the tendency to become blunt and to break out. For this reason in machining soft materials one has made shift hitherto with hard metal tools having a comparatively small chip angle.

It has now been found that for machining soft materials, such as in particular copper, aluminum, and steel of a strength of less than 60 kg., tools are particularly well suited which contain, in percentages by weight, metals of the iron group in a proportion of more than 30% but less than 50%, 2 to 10% chrome and, finally, such a remainder consisting of titanium carbide and tungsten carbide, that the ratio of the former to the latter is from 1:2 to 1:0.5.

The comparatively high percentage of metals of the iron group in the alloys according to the invention imparts to them a very high tenacity, the reduction of strength hitherto observed as a consequence of high contents of metals of the iron group being compensated by the addition of chrome. On the other hand, the mixture of tungsten carbide and titanium carbide imparts to the alloy the necessary hardness. It is required, however, that the determined ratio of the titanium carbide to the tungsten carbide is observed, because of the fact, that a tool made from an alloy having a higher content of titanium carbide easily becomes blunt, whilst a tool of an alloy having a lower content of a titanium carbide seriously tends to breaking out and thus very soon becomes useless.

Hard metal alloys according to the invention may for examples have the following compositions:

|  | Alloy I | Alloy II | Alloy III |
|---|---|---|---|
|  | Per cent | Per cent | Per cent |
| Titanium carbide | 35 | 30 | 30 |
| Tungsten monocarbide | 30 | 27 | 25 |
| Chrome | 5 | 8 | 5 |
| Cobalt |  | 25 | 25 |
| Nickel | 15 |  | 5 |
| Iron | 15 | 10 | 10 |

These three alloys are very well suited not only for the manufacture of tools for machining soft materials, but also for the manufacture of working implements, such as for example pans. The very high strength and tenacity of the present new alloys gives the possibility of providing on chip-removing tools manufactured therefrom a notably greater chip angle than with tools made of hard metal alloys hitherto known, without the danger of the cutting edge of the tool prematurely becoming blunt or breaking out. Furthermore, tools manufactured from the new hard metal alloys can be used for lower cutting speeds so that ordinary lathes can be used.

Tools or working implements can be produced from the new alloys by pressing and subsequent sintering or also by simultaneous pressing and sintering, and, finally, also by melting and casting. In the manufacture by pressing and subsequent sintering it has been found advantageous to embed the sinter bodies in a powdered oxide of high melting point, such as powdered aluminum oxide, because of embedding them in gritty coal as usual, the ability of the tool to hold its cutting power is impaired.

A further particular advantage over the hard metal bodies hitherto known resides in the fact that the present alloys are hardenable, for example by heating the tools or implements manufactured therefrom up to 1000 to 1200° C. and quenching them in oil. By this feature, that is, as it is now possible to harden hard metal bodies, their resistance to wear and their ability to hold the cutting power is increased.

Particularly satisfying results are obtained, in the manufacture of cutting bits or nibs from the new alloys, by using as auxiliary metal a mixture of iron, cobalt, and/or nickel. If iron or nickel alone would be used as auxiliary metal, the ability of the tool to hold its cutting power would be reduced.

Hard metal alloys are already known, true, which consist of titanium, tungsten, chrome, carbon, and metals of the iron group. In these known alloys, however, both the content of auxiliary metal and the carbon content are lower than in the present alloys, so that a thorough carburization of the titanium and tungsten does not take place.

What we claim and desire to secure by Letters Patent is:

1. A hard metal alloy containing more than 30% but not more than 50% by weight of metal of the iron group, about 2 to 10% chromium, the remainder of said alloy consisting of titanium carbide and tungsten carbide in the ratio of from 1:2 to 1:0.5.

2. A hard metal alloy containing more than 30% but not more than 50% by weight of a mixture of iron with one of the elements from the group cobalt and nickel, about 2 to 10% chromium, the remainder of the alloy consisting of titanium carbide, and tungsten carbide in a ratio of 1:2 to 1:0.5.

3. A hard metal alloy as specified in claim 1 in which said metal of the iron group is iron and which has been hardened by heating to 1000° to 1200° C. and then quenching in oil.

4. The method of hardening an alloy as specified in claim 1 in which said metal of the iron group is iron and which comprises heating the alloy to 1000° C. to 1200° C. and thereafter quenching in oil.

WALTHER DAWIHL.
KARL SCHRÖTER.